United States Patent [19]

Cooper

[11] Patent Number: 4,498,141

[45] Date of Patent: Feb. 5, 1985

[54] HIGH SPEED CORRELATION CIRCUIT AND METHOD

[75] Inventor: J. Carl Cooper, Sunnyvale, Calif.

[73] Assignee: Ampex Corporation, Redwood City, Calif.

[21] Appl. No.: 342,257

[22] Filed: Jan. 25, 1982

[51] Int. Cl.³ ............................................... G06F 15/34
[52] U.S. Cl. ..................................... 364/728; 364/604; 364/819; 340/146.2
[58] Field of Search ............... 364/604, 728, 819, 824; 382/33, 34, 42; 340/146.2

[56] References Cited

U.S. PATENT DOCUMENTS

| | | | |
|---|---|---|---|
| 3,648,237 | 3/1972 | Frey, Jr. et al. | 340/146.1 |
| 3,818,348 | 6/1974 | Puente | 364/728 |
| 3,961,171 | 6/1976 | Freeman | 364/728 |
| 4,166,271 | 8/1979 | Thirlwall et al. | 340/146.2 |
| 4,412,301 | 10/1983 | Strubeck | 364/824 |

OTHER PUBLICATIONS

Dr. J. Eldon, "A 20 MHz Single-Chip Digital Correlator", Electronic Engineering, 1981, vol. 53, No. 649, pp. 41-49.

Primary Examiner—Jerry Smith
Assistant Examiner—Karl Huang
Attorney, Agent, or Firm—Elizabeth E. Strnad; Joel D. Talcott

[57] ABSTRACT

High speed serial data bits of a data stream are received, stored, shifted and compared in parallel to bit contents of a known correlation word. For each bit match a known signal change is provided on a common terminal. High speed current or voltage changes on the common terminal are proportional to the number of matching bits and are monitored to detect presence of the correlation word in the received data stream. The circuit has minimum number of components and built-in temperature compensation.

31 Claims, 3 Drawing Figures

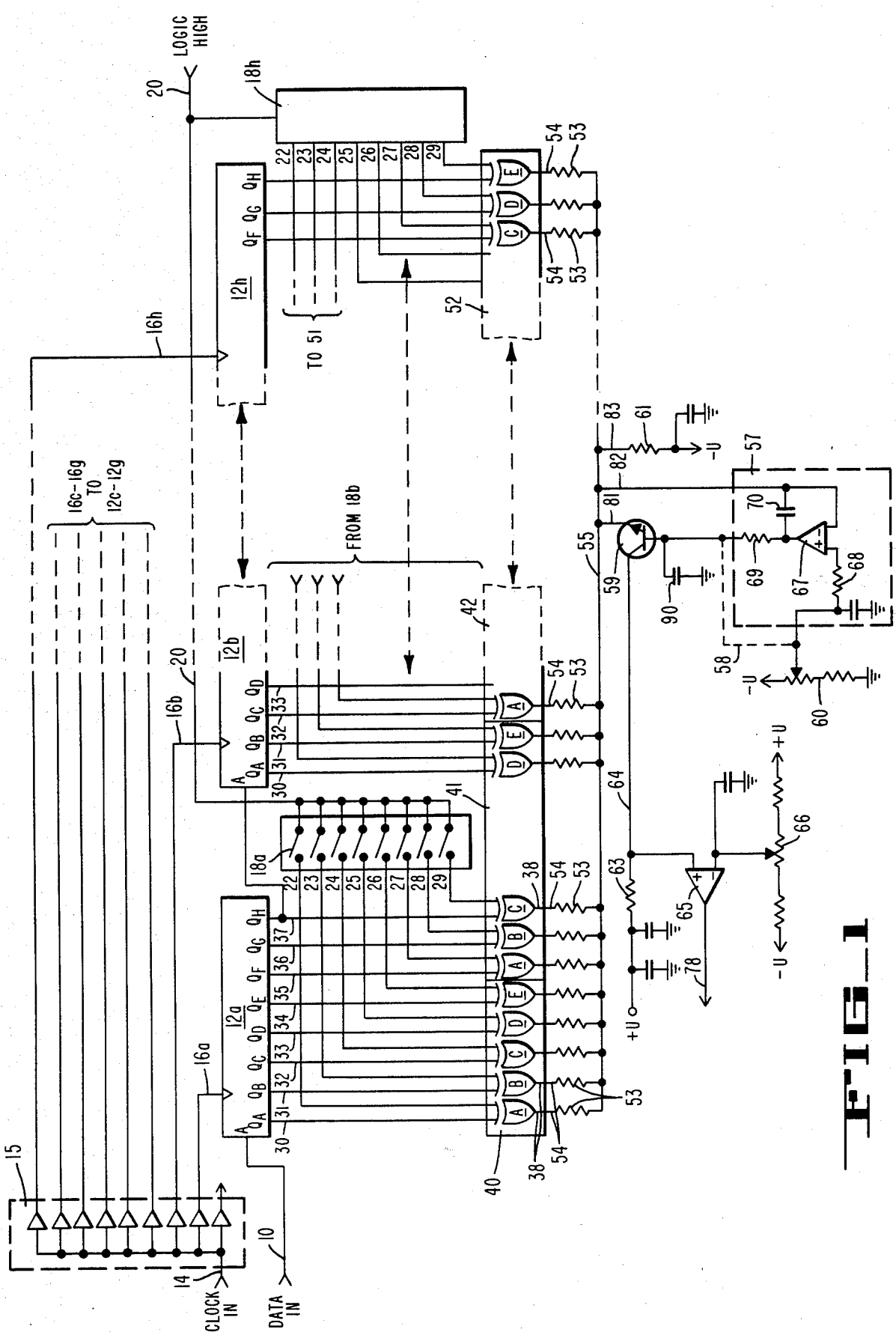

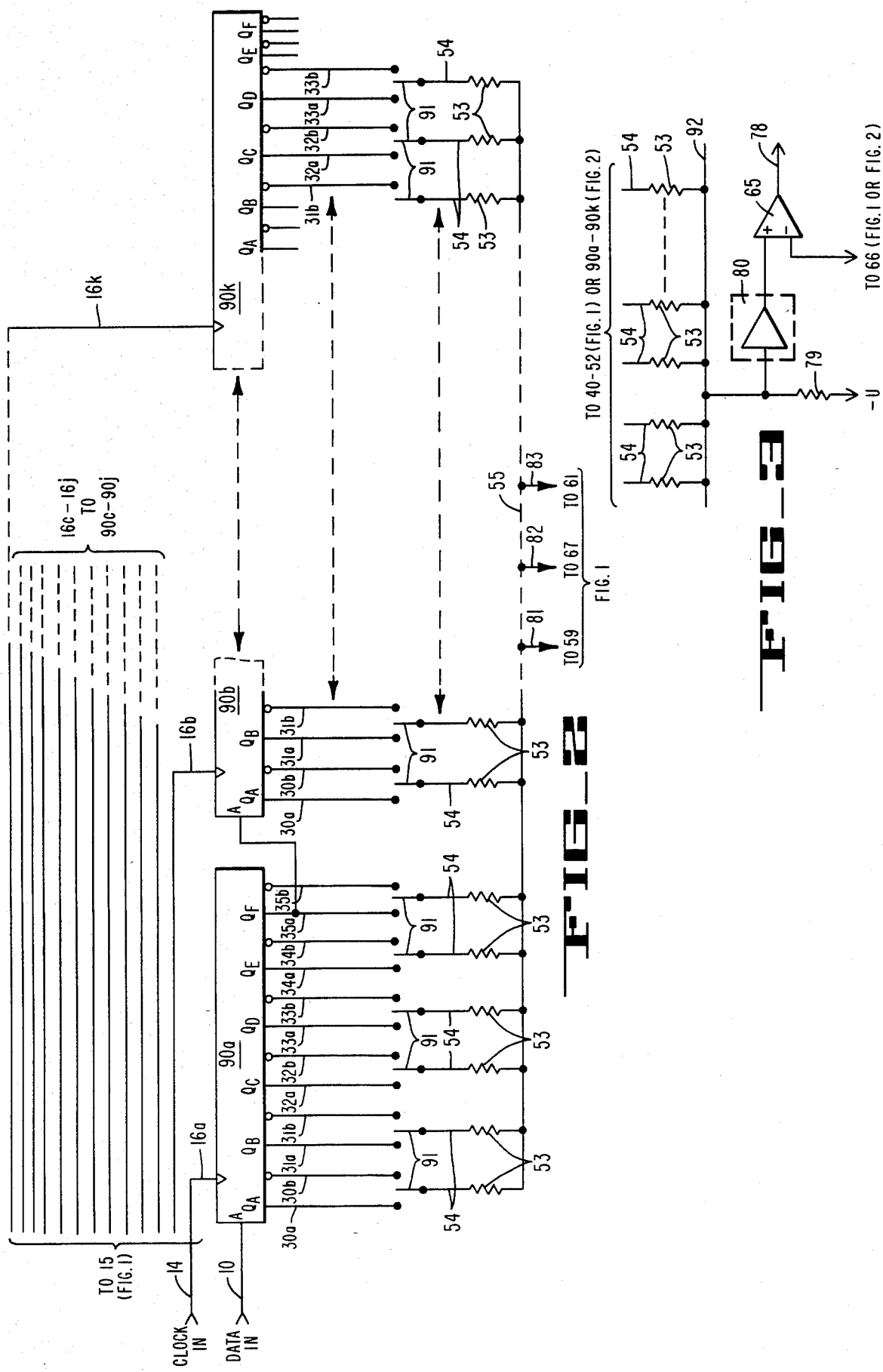

HIGH SPEED CORRELATION CIRCUIT AND METHOD

BACKGROUND OF THE INVENTION

The invention described herein was made in the course of Contract No. F 33657-81-C-1032 awarded by the United States Government.

The invention relates to an apparatus and method for detecting a known digital correlation word in a high speed information data stream for example having a frequency over 100 MHz.

Use of correlation for synchronization purposes such as in computers, magnetic recorder/playback and other types of data transfer is well known in the art. Generally it is known to insert a predetermined sequence of binary digits in a data stream prior to transmission. Upon receiving the data stream the sequence is detected and utilized to synchronize the operation of a related device. A circuit for detecting such a predetermined sequence of digits is generally referred to as correlation circuit and the sequence of digits is referred to as correlation word.

For example in rotary head magnetic recorders it is known to record a selected digital correlation word at the beginning of each head path on the tape. At playback the correlation word is identified and utilized to synchronize the playback signal.

Prior art digital correlation circuits are known to utilize binary adders and other digital circuit components to determine the bit contents of an incoming data stream. Since the latter components operate at a relatively slow speed, the speed of the entire correlator is thereby limited particularly when utilized to detect a relatively long correlation word received at a high bit rate. While it is possible to enhance the digital correlation process by increasing the number of binary adders and other components operating in parallel, the volume of necessary hardware, and thus manufacturing expenses and power requirements are also increased thereby.

SUMMARY OF THE INVENTION

It is an object of the present invention to provide a high speed correlation circuit and method capable of operating at high frequencies such as over 100 MHz while utilizing a minimum number of components.

It is a further object to provide a high speed correlation circuit and method in which the use of relatively slow digital circuit components is eliminated.

It is a further object of the invention to provide a high speed correlation circuit and method for detecting a known digital correlation word inserted in a data stream, utilizing an analog signal changing proportionally with a number of detected bits matching the correlation word.

It is still a further object to provide a high speed correlation circuit and method having the above-indicated features and providing an analog signal which is capable of a predetermined accurate change within one clock cycle.

It is still another object to provide a high speed correlation circuit and method having the above-indicated features and providing built-in temperature compensation.

It is a further object to provide a high speed correlation circuit and method wherein the correlation word may be selected as a D.C. free code, Barker code, or any known pseudorandom or other type of code.

The above-indicated and other features, objects and advantages of the correlation circuit and method for the invention will be better understood from the following detailed description in which preferred embodiments are described with reference to the accompanying drawings.

BRIEF DESCRIPTION OF THE DRAWINGS

FIG. 1 is an electric circuit diagram of a preferred embodiment representing a high speed digital correlator in accordince with the teachings of the present invention.

FIG. 2 is a schematic diagram of an alternative embodiment corresponding to a portion of FIG. 1.

FIG. 3 is a schematic diagram of an alternative embodiment corresponding to another portion of FIG. 1.

DETAILED DESCRIPTION

In the preferred embodiment of the invention shown in FIG. 1 a serial information data stream is received on line 10 for example at a clock rate of 120 MHz. The data stream contains a recurring block of data having a known sequence of bits and a predetermined length. The above-indicated block of data will be further referred to as correlation word, such as is known to be utilized for synchronization purposes in data transfer applications including communication systems, digital magnetic recording/playback and other systems well known in the art. The selected correlation word is inserted into the data stream by any of the techniques well known in the art, prior to being received on line 10. For example, a selected correlation word may be stored in a programmable memory (not shown) and the memory output may be switched into the data stream at a predetermined time such as at the beginning of each magnetic recording head path on tape, as it is well known in the art of rotary head magnetic recording. In the preferred embodiment the length of the selected correlation word is 64 bits. The sequentially received data bits on line 10 are applied to a serial-to-parallel shift register, for example implemented by eight serially connected 8-bit serial-to-parallel shift registers 12a to 12h of the type 100141 of which only shift register 12a and portions of 12b and 12h are respectively shown in FIG. 1 to simplify the drawing. A clock signal is supplied on line 14 at the above-mentioned frequency of 120 MHz by a suitable clock signal generator (not shown) such as is known to be utilized in clock recovery systems. The clock signal on line 14 is applied to a clock driver 15, preferably of the type 100122, where it is buffered and distributed via lines 16a to 16h to the individual 8-bit shift registers 12a and 12h, respectively. The separate clock lines 16a and 16h are used for the clock signal to be received at shift registers 12a and 12h simultaneously thus eliminating any potential clock skew problems.

The selected 64-bit correlation word is inserted and stored in a memory which in the embodiment of FIG. 1 is implemented by eight switch packages 18a to 18h, of the type SPST DIP manufactured by Grayhill, Inc. of which only switches 18a and 18h are shown for simplicity. Each switch package comprises eight individual single pole single throw switches. One pole of all the switches is commonly connected to a source of logic high signal, representing logic one, for example selected as −0.9 V supplied on line 20. The other pole of each switch is connected via lines 22 to 29 to a source of logic low signal, representing logic zero, via a respective logic gate A to E as it will be described further. Thus, any contact of the memory switch 18a to 18h in closed position sets the input of a corresponding gate to the logic high signal and in open position it sets the input to the logic low signal to represent a respective bit of a corresponding bit position of the correlation word. The thusly obtained bits from the memory 18a to 18h on lines 22 to 29 are compared in parallel that is, simultaneously, with the bits on lines 30 to 37 from shift register 12a to 12h, on a bit-to-bit basis. An exclusive OR gate, further referred to shortly as EXOR gate, is utilized for each bit comparison in such a way that one input of each gate is connected to one output 30 to 37 of the shift register 12a to 12h while the other input of that gate is connected to a corresponding output 22 to 29 of the memory switch 18a to 18h. Those inputs of each EXOR gate A to E which are connected to one of the outputs 22 to 29 whose associated contacts are in open position have a low logic level of $-1.8$ V or lower obtained via an internal pull down resistor (not shown), as it is well known in the art. Thus each open contact of switch 18a to 18h supplies a low logic signal to an associated EXOR gate, while each closed contact supplies a logic high signal to these gates.

While consecutive bits of the incoming data stream are received on line 10 and applied serially to shift register 12a, the previously received data bits contained in the serially connected shift registers 12a to 12h are shifted in one direction, for example, to the right by one bit position at each clock pulse. At each clock pulse the above described 64 EXOR gates compare simultaneously the 64 bits contained in shift register 12a to 12h with the 64 bit correlation word stored in the memory switch 18a to 18h. The 64 EXOR gates of FIG. 1 are implemented by thirteen identical integrated circuit packages designated 40 to 52, each package containing five EXOR gates, respectively designated A to E, as shown in FIG. 1. For simplicity of representation only gate packages 40, 41 and portions of 42 and 52 are shown in FIG. 1, respectively. With respect to the high data rate gates 40 to 52 are preferably selected as type 100107 and shift registers 12a to 12h as type 100141 respectively, both types having built-in temperature compensation to eliminate undesirable voltage drift.

As it is well known from definition of EXOR gates, each gate A to E will apply to its output 38 a logic low signal when both its input signals match, that is both inputs are low or both are high, respectively, and each gate will apply to its output a logic high signal when its input signals do not match, that is one input is high and the other one low. As it is shown in FIG. 1, the output of each individual gate A to E is coupled to one terminal of a respective current setting resistor 53. In the preferred embodiment all resistors 53 have identical values, preferably selected as 806 ohms each. Alternatively, it would be possible to weigh each of the outputs 38 by utilizing different resistor values, for example, an output having a 1612 ohm resistor would supply only one half of the current value supplied by an 806 ohm resistor. The other terminals of each resistor 53 are connected to a common terminal, preferably implemented by a current summing bus 55, whose voltage is maintained constant, preferably at the logic low level $-1.8$ V in a manner which will be disclosed below in more detail.

In the operation, during each clock cycle a match may be detected between some bits compared by the EXOR gates while the other bits may not match. Each EXOR gate A to E, whose input signals do not match will produce at its respective output 38 a high logic output signal of $-0.9$ V. The latter signal causes current to flow through an associated resistor 53 into the summing bus 55 which is maintained at a low level of $-1.8$ V as previously mentioned. Thus when no match is found by a particular EXOR gate it will supply a known amount of current to bus 55, determined by the gate output voltage, the bus voltage and the value of the current setting resistor 53. On the other hand, when a match is found by a particular gate that gate will provide a low logic output signal of $-1.8$ V and thus, no current will flow from that gate into the bus 55 via an associated resistor 53. Consequently, the total value of current on the bus 55 can be precisely determined for any number of existing matches, or alternatively, the number of obtained matches can be precisely determined from the current value detected on the bus 55.

It follows from the foregoing description that when the selected correlation word is contained in the shift register 12a to 12h then the outputs 38 of all the EXOR gates 40 to 52 will be at the low voltage level of $-1.8$ V. Consequently, ideally no current from these gates will flow on the bus 55.

To simplify the further description of the preferred embodiment of FIG. 1 it will be first described without considering a circuit portion 57 providing voltage drift compensation. In the following simplified description a connecting line 58 shown by a dashed line will be considered as replacing the circuit connections provided by circuit portion 57. A transistor 59 having its emitter connected to the current summing bus 55 via line 81 is utilized both as current amplifier and current-to-voltage converter, as it will follow from the description below. In the simplified embodiment the base of transistor 59 is connected by line 58 to a voltage divider 60 which is adjusted to provide a reference voltage corresponding to the logic low level of bus 55. In the circuit of FIG. 1 the bus 55 is maintained at $-1.8$ V by connecting a voltage setting resistor 61 between a power supply -U and the bus 55. The base of the transistor 59 is bypassed to ground via capacitor 90 and its collector is connected to a positive power supply +U via line 64 and resistor 63. In the preferred embodiment the respective power supplied +U and -U are selected +5 V and -5 V, respectively. As previously disclosed, for each disagreement of bits at the respective inputs of EXOR gates A to E of gate packages 40 to 52 the current on the bus 55 increases by a predetermined amount, which in the preferred embodiment is approximately 1 mA. Thus, with each such disagreement the current flowing through the emitter of transistor 59 and resistor 63 will decrease linearly, causing in turn the collector voltage to increase linearly with respect to ground. Assuming that the base of transistor 59 is maintained at a constant voltage, the above-described circuit operates as a common base amplifier where the emitter current will change to maintain the emitter-base voltage constant. Consequently, the emitter voltage and thus the voltage on bus 55 will also remain constant, respectively, assuming no considerable voltage drift occurs due to temperature changes.

To satisfy the requirements of a desired linearity and high speed of operation, in the preferred embodiment transistor 59 is implemented by type 2N5943 having a very high speed and linear characteristics within a wide operating range, including swings between the minimum and maximum current values which may occur due to current changes at the current summing point on the bus 55. Also, the value of voltage setting resistor 61 is selected to obtain optimum current characteristics of transistor 59. More specifically, transistor 59 is selected to have its collector voltage capable of a full scale linear change within one clock cycle, that is, within 8.3 nanosecond when the 120 MHz clock rate is utilized in the preferred embodiment. To obtain the foregoing, it is understood that transistor 59 must be able to drive maximum parasitic capacitances originating both from its internal junctions and external connections so that a full voltage swing may be made within one clock cycle. Since in the embodiment of FIG. 1 the voltage on bus 55 is maintained constant there is no loss of speed of operation due to resistor-capacitor time constants associated with capacitance of bus 55. The magnitude of the current on bus 55 changes in linear proportion to the number of matching bits. It will be understood that while in theory the current on the bus 55 changes in discrete steps in response to each change in bit comparisons, in practice that change may appear as being continuous due to limitation of the speed of circuit components.

In the preferred embodiment the voltage changes on line 64 are sensed by a voltage comparator 65, for example implemented by a dual analog-to-digital converter, type MC1651, which is a very high speed comparator utilizing differential amplifier inputs to detect analog signals having a magnitude above or below a preset reference level. In the preferred embodiment a noninverting input of comparator 65 is connected to line 64 and its inverting input to a voltage divider 66 preset to a reference voltage level as follows.

It has been previously mentioned that when the correlation word is present in the shift register 12a to 12h ideally there will be no current flowing via resistors 53 into the summing bus 55. Thus, the current on line 64 will be at its maximum value and the corresponding voltage level on line 64 will assume a minimum value. The voltage divider 66 is preset to detect by voltage comparator 65 such a minimum voltage on line 64 corresponding to a minimum number of allowable disagreements obtained by the gates A to E of gate packages 40 to 52. For example, in the preferred embodiment utilizing a 64-bit correlation word an agreement between at least 60 bits is considered to indicate presence of the correlation word in the shift register. The latter provision includes for example allowance for a maximum of four erroneous bit comparisons which may occur due to transmission errors. Thus, when an agreement between 60 or more bits is obtained, the voltage on line 64 will be below the voltage preset on divider 66 and the comparator 65 will generate an output signal on line 78 indicating presence of the correlation word in the shift register.

It is seen from the foregoing description that transistor 59 besides serving as a linear current amplifier it also serves as a linear current-to-voltage converter. Either edge of the output pulse on line 78 may be utilized to initiate a control signal which in turn can be utilized for synchronization or control of associated equipment, such as resetting counters, to obtain synchronization of a magnetically recorded signal at playback or in similar applications.

Alternatively, if desired, it would be possible to provide a maximum current value on bus 55 when a predetermined number of agreements is obtained, indicating presence of the correlation word. In the latter case the complement of the correlation word would be stored in memory switches 18a to 18h, or, exclusive NOR gates would be utilized instead of gates A to E while the voltage on line 64 would be at its maximum value when the correlation word is present in the shift register 12a to 12h. In this alternative embodiment, the reference voltage of divider 66 would be preset to a maximum voltage value obtained on line 64 corresponding to detection of the correlation word. A control pulse would then be provided on line 78 by comparator 65 when the voltage on line 64 exceeds the preset reference voltage of divider 66. It is seen that in this alternative embodiment the high and low current and voltage values with respect to transistor 59 are reversed when compared with the previously described preferred embodiment.

Depending on the particular application for which the correlation circuit of the present invention is utilized, it is possible to monitor the voltage changes on line 64 or on bus 55 directly, that is without utilizing a comparator such as shown at 65. For example, the latter voltage could be monitored by a digital or analog voltmeter or a similar device whose readout changes proportionally with the number of bit matches obtained by the correlation circuit.

It has been mentioned before that the abovedescribed portion of the correlation circuit of the invention is capable of operating at frequencies over 100 MHz provided no substantial voltage drift occurs within the circuit. However, should the voltage between the emitter and base of transistor 59 change during operation, for example, due to ambient temperature changes, a voltage drift will occur on bus 55, introducing in turn errors into the correlation process. In accordance with the present invention, compensation circuit 57 is provided to prevent such errors.

It is noted with reference to FIG. 1 that when utilizing the compensation circuit 57, the previously described interrupted line 58 connecting the base of transistor 59 with voltage divider 60, will be deleted. Circuit 57 comprises a differential operational amplifier 67, preferably type LM741, having its non-inverting input coupled to an output of the voltage divider 60 via a resistor 68, while its inverting input is connected via line 82 to the current summing bus 55. The output of amplifier 67 is coupled to the base of transistor 59 via a resistor 69. A feedback capacitor 70 is connected between the output of amplifier 67 and its inverting input. The operation speed of amplifier 67 is not critical, as it will follow from further description.

The above-described compensation circuit 57 represents a negative feedback loop connected between the emitter and base of transistor 59 and it operates as follows. The reference voltage of divider 60 is preset to the known voltage level at which bus 55 is to be maintained constant that is, in the preferred embodiment it is preset to $-1.8$ V. When the voltage on bus 55 increases above the latter value, for example, due to temperature changes, the output voltage of the amplifier 67 and the base voltage of transistor 59 both decrease linearly. The decreased base voltage of transistor 59 pulls down the emitter voltage and thus also the voltage on bus 55 until the latter voltage returns to the desired value of $-1.8$ V. Analogously, when voltage on bus 55 decreases below the above-designated reference voltage, the compensation circuit 57 causes a voltage increase at the transistor base, followed in turn by a corresponding increased voltage of the emitter and thus of bus 55, until the desired voltage of −1.8 V is obtained on the bus 55. It is seen that amplifier 67 amplifies a voltage change on the bus 55 and it feeds back an inverted integrated difference voltage to the base of transistor 59, obtained as a difference between the actual bus voltage at 55 and the reference voltage at divider 60. Consequently, no significant long term voltage change on bus 55 will occur, since it is continuously compensated for by the above-described circuit 57.

It is seen from the foregoing description that circuit 57 compensates for any voltage changes on bus 55 as well as for any changes in the emitter-base voltage of transistor 59, for example, effected by internal or external temperature changes or other causes.

It is seen that in the embodiment of FIG. 1 the stored correlation word may be readily changed by opening or closing the individual contacts 22 to 29 of the memory switch 18a to 18h to store therein respective bits corresponding to "0" or "1" of that word. However, in applications where the selected correlation word remains unchanged the circuit of FIG. 1 may be simplified as it is shown in FIG. 2 and will be described below.

FIG. 2 shows such a simplified embodiment in which the memory switches 18a to 18h and the EXOR gates 40 to 52 of FIG. 1 are deleted. To facilitate comparison, similar circuit elements in FIGS. 1 to 3 are designated by like reference numerals. Instead of the previously described eight 8-bit shift registers 12a to 12h of FIG. 1, in FIG. 2 there are utilized eleven 6-bit shift registers 90a to 90k preferably of the type 100151 manufactured by Fairchild Corporation, each having a non-inverting and inverting pair of parallel outputs 30a, 30b to 35a, 35b, respectively. Thus when a 64-bit correlation word is utilized in the embodiment of FIG. 2 the last two pairs of outputs of shift register 90k are not used, as shown in the drawing. One output of each pair is coupled to an associated current setting resistor 53 as follows. When a corresponding bit position of the selected correlation word contains bit "1" then a non-inverting output of a corresponding pair of outputs in the shift register 90a to 90k will be connected to an associated resistor 53. Analogously, inverting outputs of the shift register 90a to 90k are taken from those pairs of outputs which correspond to a "0" bit of the correlation word. Since all the bit values of the correlation word are known it is possible to connect permanently an inverting or non-inverting output of each pair of outputs 30a, 30b to 35a, 35b to a respective terminal 54 of an associated resistor 53 in the above-described manner. Contacts 91 in FIG. 2 represent such connections which in the latter embodiment are permanently connected, for example by soldering, to a corresponding inverting or non-inverting output 30a, 30b to 35a, 35b as described above. The non-inverting outputs 30a to 35a provide a logic high voltage, for example, selected as −0.9 V and the inverting outputs 30b and 35b provide a logic low voltage, for example selected as −1.8 V, respectively. The latter output voltage values are provided by the above-mentioned type of shift register which is utilized to implement shift registers 90a to 90k in the preferred embodiment of FIG. 2. It will be understood that with the exception of the above-described simplified circuit portions other portions of the circuit of FIG. 2 are similar to those of FIG. 1 and therefore are deleted from FIG. 2 and their description will not be repeated herein.

In operation, for example, when a "0" bit is obtained by a particular inverting parallel output 30b to 35b that output will provide a "1." On the other hand, when a "0" bit is present at a non-inverting parallel output 30a to 35a of the shift register 90a to 90k the output signal stays unchanged as "0". Analogously, when a bit "1" is obtained by an inverting parallel output the output will be "0". However, upon receiving a bit "1" by a non-inverting parallel output the output signal stays "1". It is seen that in this latter embodiment whenever a bit stored at a particular location in the shift register 90a to 90k matches the bit of a corresponding bit position of the correlation word, the output signal will be logic "1", that is "high" or "true". Consequently when all or at least a predetermined number of output signals at outputs 30a to 35b from the shift register 90a to 90k is high, presence of the correlation word in the shift register is detected in a manner as previously described with reference to FIG. 1.

FIG. 3 shows another alternative embodiment corresponding to either of the previously described embodiments of FIG. 1 or 2, however, utilizing a current summing bus 92 whose voltage is not maintained at a constant level, as it has been the case in the previously described embodiments. Consequently, in the embodiment of FIG. 3 the voltage on bus 92 changes in non-linear proportion with the number of logic high and low output signals obtained at the respective terminals 54 of current setting resistors 53. The latter number corresponds to the number of bits in an associated shift register such as 12a to 12h of FIG. 1 or 90a to 90k of FIG. 2, respectively, matching the respective bits of a selected correlation word, as it has been described previously. In the embodiment of FIG. 3 the thusly changing voltage on bus 92 is directly amplified by an operational amplifier 80 and the amplified voltage therefrom is applied to a non-inverting input of a voltage comparator for example corresponding to the previously described analog-to-digital comparator 65 of FIG. 1. It will be understood that if sufficient voltage change on bus 92 can be obtained without amplification, amplifier 80 may be deleted. Since in the embodiment of FIG. 3 the voltage changes on bus 92 are directly compared by comparator 65, previously described elements of FIG. 1, such as current-to-voltage converter 59 voltage source 60, and circuit portion 57 are respectively deleted from the circuit of FIG. 3, thus simplifiying the correlator. However, since in the embodiment of FIG. 3 both the current and voltage on bus 92 will change proportionally with the number of obtained matches, the resulting voltage change on line 78 will be non-linear with the number of obtained matches. In practical application where linearity is desired it would be possible to select the characteristics of amplifier 80 such that they substantially compensate for the nonlinearity. Alternatively, it is possible to select the characteristics of comparator 65 such that they provide sufficient sensitivity, that is, sufficient input gain to detect voltage changes within the voltage range on the bus 92 indicating presence of the correlation word. If amplifier 80 is needed in the circuit, preferably a type having internal temperature compensation should be selected.

In the embodiments of FIG. 1 to 3 the voltage setting resistor 61 or 79, respectively coupled to the current summing bus 55 or 92, may be replaced by a constant current source, as well known in the art.

When the correlation circuit of the invention is utilized for synchronization of playback signal in rotary head magnetic tape recorders where more than one transducer is utilized to sweep a predetermined path on the tape, it may be desirable to identify each individual transducer at playback. To the latter effect a distinct correlation word for each transducer may be recorded at the beginning of each head path. In playback it is then necessary to utilize a switch for connecting a respective memory storing a corresponding correlation word to a comparator, such as to the EXOR gates 40 to 52, prior to each expected playback head sweep.

From the foregoing description it follows that the correlation circuit and method of this invention provide an analog signal which changes in proportion to the number of bits in a digital data stream which match a preset digital word. It is a particular advantage of this invention that the above-indicated analog signal is capable of full scale change within a very short time such as 8.3 nanoseconds in the preferred embodiment or less. Consequently, the correlation process can be performed at a high frequency, such as at 120 MHz and over. Another significant advantage is that the operation of the correlation circuit and method, as described with reference to the embodiments of FIGS. 1 and 2, is linear and that it provides compensation for temperature changes.

While by the device and method of the invention the above-indicated advantages are obtained, the number of necessary circuit components, other than resistors, is reduced to minimum. At the same time the device of the invention does not utilize digital adders or other components operating at a relatively slow speed with respect to the rate of the serial data stream.

It will be appreciated that when utilizing the digital correlator and method of this invention, the operation speed is virtually unrestricted by the length of the correlation word provided that the maximum current on the bus does not exceed specifications of the particular circuit elements utilized. It will be understood on the other hand, that the current flowing through each individual resistor 53 must have a predetermined minimum value necessary to eliminate any influence which parasitic capacitances may have on the high operation speed of the correlation circuit and method of the invention.

While the invention has been shown and described with particular reference to preferred and alternative embodiments thereof, it will be understood that variations and modifications in form and details may be made therein without departing from the spirit and scope of the invention as defined in the appended claims.

What is claimed is:

1. A high speed correlation circuit for detecting a known digital correlation word in a serial data stream, comprising:
    a first means coupled to receive and store consecutive bits of said serial data stream and to shift said stored bits by one bit position in succession when a new bit is received thereby, said first means being coupled to store information related to respective bit contents of said known correlation word and to detect a match at corresponding bit positions between said stored data bits and said known correlation word bits, respectively, said first means having a plurality of parallel outputs each coupled to provide an output signal of a predetermined magnitude in response to one said match, respectively;
    a plurality of current setting second means each having an input coupled to one said output of said first means and each having an output coupled to provide a known amount of current, said respective outputs of said second means being coupled to a common terminal to provide an output signal having a magnitude proportionally changing with the number of matches obtained by said first means; and
    a third means coupled to maintain said common terminal at a predetermined constant voltage level.

2. The circuit of claim 1 further comprising a means coupled to said common terminal of said second means for detecting a known magnitude of said output signal provided by said second means in response to a predetermined number of matches obtained by said first means.

3. The circuit of claim 2 wherein said means for detecting comprises:
    a means coupled to provide a first reference signal corresponding to a known magnitude of said output signal provided by said common terminal of second means in response to a predetermined number of matches obtained by said first means; and
    a means coupled to compare said output signal provided by said common terminal of said second means with said first reference signal and to provide responsively a control signal.

4. The circuit of claim 1 wherein said output signal provided by said second means is a current substantially linearly changing with said number of matches obtained by said first means and wherein said third means comprises a means coupled to said common terminal of said second means for substantially linearly converting said current changes into voltage changes.

5. The circuit of claim 4 further comprising:
    a means coupled to provide a reference voltage corresponding to a known magnitude of said converted voltage provided by said third means corresponding to a predetermined number of matches obtained by said first means; and
    a means coupled to compare said converted voltage provided by said third means with said reference voltage and to provide responsively a control signal.

6. The circuit of claim 1 wherein said first means comprises:
    a serial-to-parallel shift register means having an input coupled to receive said consecutive bits of the serial data stream and having a plurality of parallel outputs each containing one bit stored in said shift register means;
    a presettable memory means coupled to store respective bits of said known correlation word, said memory means having a plurality of parallel outputs each containing one said bit stored therein; and
    a plurality of comparator means, each having a first and a second input, respectively, each first input being coupled to one parallel output of said shift register means and each said second input being coupled to a corresponding parallel output of said presettable memory means, respectively, each said comparator means having an output corresponding to one said parallel output of said first means.

7. The circuit of claim 6 wherein said plurality of comparator means each comprises a logic gate providing a first logic signal level when said match is obtained thereby and providing a second logic signal level when said match is not obtained thereby.

8. The circuit of claim 1 wherein said first means comprises a serial-to-parallel shift register means having an input coupled to receive said consecutive bits of the serial data stream and having a plurality of parallel outputs each output providing an output signal corresponding to one bit stored in said shift register means, those of said parallel outputs whose position corresponds to a low bit position of said known correlation word are coupled to provide output signals representing a first logic level while those parallel outputs of said shift register means which correspond to a high bit position of said known correlation word are coupled to provide output signals representing a second logic level.

9. The circuit of claim 1 wherein said second means comprises a plurality of current setting resistors, each resistor having a first terminal coupled to one said parallel output of said first means, respectively, and wherein respective second terminals of said resistors are coupled to a common terminal.

10. The circuit of claim 9 wherein said current setting resistors have identical values.

11. The circuit of claim 9 wherein each said resistor has a value selected to apply an appreciable amount of current to said common terminal when said output signal of said predetermined magnitude is provided by a corresponding parallel output of said first means coupled to said first terminal of said resistor.

12. The circuit of claim 1 wherein said third means for maintaining said common terminal at a predetermined constant voltage level comprises a transistor means having an emitter coupled to a first voltage supply via said common terminal and a first series resistor, a collector coupled to a second voltage supply via a second series resistor and a base coupled to a first reference voltage source providing a voltage corresponding to a predetermined constant voltage level to be maintained on said common terminal.

13. The circuit of claim 12 wherein said circuit further comprises:
 a second reference voltage source providing a voltage corresponding to a voltage obtained at the collector of said transistor means when a predetermined number of matches is obtained by said first means; and
 a comparator means having a first input coupled to receive a voltage obtained at the collector of said transistor means and a second input coupled to receive a voltage provided by said second reference voltage source, said comparator means being coupled to provide an output signal responsive to a difference between its respective input voltages.

14. The circuit of claim 13 wherein said transistor means and said comparator means, respectively, are high speed devices capable of operations at frequencies over 100 MHz.

15. The circuit of claim 12 further comprising negative feedback means coupled between the emitter and base of said transistor means to maintain said predetermined constant voltage level on said common terminal.

16. The circuit of claim 15 wherein said negative feedback means comprises a differential amplifier means having an inverting input coupled to a connection of said emitter with said common terminal, a non-inverting input coupled to said first reference voltage source and an output coupled to the base of said transistor means, respectively.

17. The circuit of claim 1 wherein said second means comprises a plurality of parallel resistors each having a first terminal coupled to one said parallel output of said first means, respective and wherein respective second terminals of all said resistors are coupled to a common terminal whose current changes in non linear proportion to the number of matches obtained by said first means, wherein said third means comprises a means coupled to said common terminal for substantially linearly converting said current changes into voltage changes, and wherein said circuit further comprises a differential amplifier having a first input coupled to an output of said converting means and a second input coupled to a source of reference voltage corresponding to a known magnitude of said converted voltage provided by said third means when a predetermined number of matches is obtained by said first means.

18. A high speed correlation circuit for detecting presence of a known digital correlation word in a serial data stream, comprising:
 a serial-to-parallel shift register means having an input coupled to receive and store consecutive bits of said serial data stream and to shift said stored bits by one bit position in succession when a new bit is received thereby, said shift register means having a plurality of parallel outputs each containing one bit stored in said shift register means;
 a presettable memory means coupled to store respective bits of said known correlation word, said memory means having a plurality of parallel outputs each containing one bit stored in said memory means;
 a plurality of logic gates each having a first input coupled to one parallel output of said shift register means and a second input coupled to a corresponding parallel output of said memory means, each logic gate having an output coupled to provide an output signal of a first known logic signal level when matching bits are obtained at its respective inputs and output signal of a second known logic signal level when its input bits do not match, respectively;
 a plurality of resistors each having a first terminal coupled to an output of one said logic gate, the other terminals of said resistors being coupled to a common terminal, each said resistor having a value selected to apply an appreciable amount of current to said common terminal when one of said first or said second known logic signal level is provided by said logic gate;
 means coupled to maintain said common terminal at a predetermined constant voltage level to obtain a substantially linearly changing current thereon with the number of bit matches obtained by said logic gates;
 a current-to-voltage converter means coupled to said common terminal for substantially linearly converting said current changes thereon to corresponding voltage changes; and
 means coupled to an output of said current-to-voltage converter means for detecting a known voltage magnitude obtained on said common terminal in response to a predetermined number of matching bits obtained by said plurality of logic gates.

19. The circuit of claim 18 wherein said means for detecting comprises a first reference voltage source providing a voltage corresponding to an output voltage from said converter means when a predetermined number of matching bits is obtained by said plurality of logic gates and a comparator means having a first input coupled to receive said output voltage provided by said converting means and a second input coupled to receive said voltage provided by said first reference source and having an output responsively providing a control signal when a comparison is obtained.

20. A high speed correlation circuit for detecting presence of a known digital correlation word in a serial data stream comprising:
- a first means coupled to receive and store consecutive bits of said serial data stream and to shift said stored bits by one bit position in succession when a new bit is received thereby, said first means being coupled to store information related to respective bit contents of said known correlation word and to detect a match at corresponding bit positions between said stored data bits and said known correlation word bits, respectively, said first means having a plurality of parallel outputs each coupled to provide an output signal of a predetermined level in response to one said match, respectively;
- a plurality of resistors, each having a first terminal coupled to one said parallel output of said first means, respectively, respective second terminals of said resistors being coupled to a common terminal;
- a transistor means having an emitter coupled to a first voltage supply via said common terminal and a first series resistor, a collector coupled to a second voltage supply via a second series resistor and a base coupled to a reference voltage source providing a voltage corresponding to a predetermined constant voltage level to be maintained on said common terminal; and
- negative feedback means coupled between the emitter and base of said transistor means to maintain said predetermined constant voltage level on said common terminal.

21. The circuit of claim 20 wherein said negative feedback means comprises a differential amplifier means having an inverting input coupled to a connection of said emitter with said common terminal, a non-inverting input coupled to said reference voltage source and an output coupled to the base of said transistor means;
said plurality of resistors applying to said common terminal a current whose magnitude changes proportionally with the number of matches obtained by said first means.

22. A high speed correlation method for detecting a known digital correlation word in a serial data stream, comprising the steps of:
- receiving and storing consecutive bits of the serial data stream and shifting said stored bits by one bit position in succession when a new bit is received;
- storing information related to respective bit contents of said known correlation word;
- matching simultaneously respective bits pertaining to corresponding bit positions of said stored serial data and said correlation word, respectively and providing an output signal of a predetermined level in response to each obtained match;
- providing for each said output signal level a predetermined corresponding current value;
- summing said current values at a current summing point to obtain a current whose magnitude changes proportionally with the number of obtained bit matches; and
- maintaining said current summing point at a predetermined constant voltage level to obtain a proportionally changing current with the number of obtained bit matches.

23. The method of claim 22 further comprising the step of linearly converting said changing current into a changing voltage.

24. The method of claim 23 further comprising the step of detecting a known magnitude of said changing voltage corresponding to a predetermined number of obtained bit matches.

25. The method of claim 24 wherein said detecting step comprises the steps of:
- providing a reference voltage corresponding to a magnitude of said changing voltage obtained in response to a predetermined number of bit matches; and
- comparing said changing voltage with said reference voltage and responsively providing a control signal.

26. The method of claim 21 wherein said current changes in non-linear proportion with respect to the number of obtained bit matches.

27. The method of claim 22 comprising the step of compensating for changes of said predetermined constant voltage level due to temperature changes.

28. The method of claim 22 wherein said serial data stream is received at a frequency over 100 MHz.

29. The method of claim 22 wherein said current changes in substantially linear proportion with the number of obtained bit matches.

30. A correlation circuit, comprising:
- a first means coupled to receive and store consecutive bits of a serial data stream, said first means being further coupled to store information related to bit contents of a known correlation word, and to compare said stored serial data bits with said known correlation word, said first means having a plurality of outputs, each coupled to provide an output signal of a known magnitude for each match obtained between a stored serial data bit and known correlation word bit;
- a plurality of current setting second means each having an input coupled to one said output of said first means and each having an output, said respective outputs of said second means being coupled to a common terminal; and
- a third means coupled to maintain said common terminal at a predetermined constant voltage level.

31. A high speed correlation circuit, comprising;
- a first means coupled to receive and store consecutive bits of a serial data stream, said first means being further coupled to store information related to bit contents of a known correlation word, and to compare said stored serial data bits with said known correlation word, said first means having a plurality of outputs, each coupled to provide an output signal of a known magnitude for each match obtained between a stored serial data bit and known correlation word bit;
- a plurality of second current setting resistor means each having an first terminal coupled to one said output of said first means, said resistor means having their respective second terminals interconnected to a common e terminal, each resistor means applying a known amount of current to said common terminal in response to said output signal obtained at said output of the first means connected to said resistor means;
- a third means coupled to said common terminal for substantially linearly inverting said current on said common terminal to a voltage;
- a fourth means coupled to provide a reference voltage corresponding to a known magnitude of said converted voltage corresponding to a predetermined number of matches obtained by said first means;

a fifth means coupled to compare said converted voltage with said reference voltage and to provide responsively a control signal; and a sixth means coupled to said common terminal for maintaining thereon a predetermined constant voltage.

* * * * *

UNITED STATES PATENT AND TRADEMARK OFFICE
CERTIFICATE OF CORRECTION

PATENT NO. : 4,498,141

DATED : February 5, 1985

INVENTOR(S) : J. Carl Cooper

It is certified that error appears in the above-identified patent and that said Letters Patent is hereby corrected as shown below:

Column 2, line 12, "accordince" should read --accordance--;

Column 14, line 64, "inverting" should read --converting--.

Signed and Sealed this

Twentieth Day of August 1985

[SEAL]

Attest:

DONALD J. QUIGG

Attesting Officer     Acting Commissioner of Patents and Trademarks